(12) United States Patent
Wetherall et al.

(10) Patent No.: US 7,058,015 B1
(45) Date of Patent: Jun. 6, 2006

(54) DISTRIBUTED SOLUTION FOR REGULATING NETWORK TRAFFIC

(75) Inventors: David J. Wetherall, Seattle, WA (US); Thomas E. Anderson, Seattle, WA (US); Stefan R. Savage, Seattle, WA (US)

(73) Assignee: Arbor Networks, Inc., Lexington, MA (US)

( * ) Notice: Subject to any disclaimer, the term of this patent is extended or adjusted under 35 U.S.C. 154(b) by 975 days.

(21) Appl. No.: 09/631,898

(22) Filed: Aug. 4, 2000

(51) Int. Cl.
*G06F 11/00* (2006.01)
*G06F 15/16* (2006.01)
*G06F 15/173* (2006.01)

(52) U.S. Cl. .................. 370/236; 370/230; 726/23; 709/224; 709/225; 709/229; 709/232; 709/235

(58) Field of Classification Search ........ 370/229–236, 370/252; 709/223–225, 229–235
See application file for complete search history.

(56) References Cited

U.S. PATENT DOCUMENTS

| | | | |
|---|---|---|---|
| 5,943,480 A | 8/1999 | Neidhardt | |
| 5,963,543 A | 10/1999 | Rostoker et al. | |
| 6,078,953 A * | 6/2000 | Vaid et al. | 370/235 |
| 6,405,250 B1 * | 6/2002 | Lin et al. | 709/224 |
| 6,529,475 B1 * | 3/2003 | Wan et al. | 370/231 |
| 6,542,466 B1 * | 4/2003 | Pashtan et al. | 370/235 |
| 6,678,245 B1 * | 1/2004 | Cooper et al. | 370/230 |
| 6,765,864 B1 * | 7/2004 | Natarajan et al. | 709/224 |
| 6,894,972 B1 * | 5/2005 | Phaal | 370/229 |

OTHER PUBLICATIONS

Mario Gerla et al., "Network Management Using Database Discovery Tools", Proceedings, 16th Conference on Local Computer Networks, Oct. 14-17, 1991, Minneapolis, MN, USA, pp. 378-385, Oct. 14, 1991, IEEE Computer Society, Los Alamitos, CA, USA.

(Continued)

*Primary Examiner*—Steven Nguyen
(74) *Attorney, Agent, or Firm*—Houston Eliseeva LLP

(57) ABSTRACT

A number of sensors are distributively deployed in a network, either integrally disposed in a number of routing devices of the network or externally disposed and coupled to the routing devices, to monitor and report on network traffic routed through the routing devices. A director is provided to receive network traffic reports from the sensors for the routing devices, and to determine whether moderating actions are to be taken to moderate an amount of network traffic, based at least in part on some of the network traffic reports received from the sensors. In one embodiment, upon determining moderating actions are to be taken, the director further determines what kind of moderating actions are to be taken, including where the moderating actions are to be taken. In one embodiment, the director further instructs appropriate ones of the sensors to cause the desired moderating actions to be applied on the network traffic going through some of the routing devices. In one embodiment, the director, in cooperation with the sensors, also determines when and where moderating actions are to be relaxed, and causes such relaxation to be effectuated. In yet another embodiment, the director, in cooperation with the sensors, also determines when and where regulating actions filtering out certain types of network traffic destined for a network node are to be applied, and causes such filtering to be performed.

37 Claims, 10 Drawing Sheets

OTHER PUBLICATIONS

Aurel Lazar et al., "An Architecture for Managing Quality of Service on Broadband Networks", Singapore ICCS/ISITA 1992, Nov. 16-20, 1992, pp. 974-978, Nov. 16, 1992, IEEE, New York, NY, USA.

Jiann-Liang Chen et al., "A Knowledge-based System for ATM Network Management", IEEE International Conference (on Systems, Man, and Cybernetics, Humans, Information, and Technology), San Antonio, TX, USA, Oct. 2-5, 1994, pp. 548-552, Oct. 2, 1994, IEEE, New York, NY, USA.

Jiahai Yang et al., "A Scalable, Web-based Architecture for Hierarchical Network Management", Global Telecommunications Conference—Globecom 1999, Enterprise Applications and Services, pp. 1882-1888, IEEE.

* cited by examiner

DISTRIBUTED SOLUTION FOR REGULATING NETWORK TRAFFIC

BACKGROUND OF THE INVENTION

1. Field of the Invention

The present invention relates to the field of networking. More specifically, the present invention relates to the regulation of network traffic.

2. Background Information

With advances in integrated circuit, microprocessor, networking and communication technologies, increasing numbers of devices, in particular, digital computing devices, are being networked together. Devices are often first coupled to a local area network, such as an Ethernet based office/home network. In turn the local area networks are interconnected together through wide area networks, such as ATM networks, Frame Relays, and the like. Of particular note is the TCP/IP based global inter-networks, Internet.

As a result this trend of increased connectivity, increasing numbers of applications that are network dependent are being deployed. Examples of these network dependent applications include but are not limited to, email, net-based telephony, world wide web and various types of e-commerce. For these applications, success inherently means high volume of desirable network traffic for their implementing servers. To ensure continuing success, quality of service through orderly and efficient handling of the large volume of network traffic has become of paramount importance. Various subject matters, such as scalability, distributive deployment and caching of contents as well as regulating network traffic destined for a network node have become of great interest to the artesian.

SUMMARY OF THE INVENTION

The present invention provides for a method and apparatus for controlling the amount and/or type of network traffic destined to cross a network link, such as a router, to facilitate ensuring the quality of service provided by the network nodes attached to such network link. The present invention may be used to shape the volume and/or the type of network traffic arriving at a network node or network traffic in or near the neighborhood of the network node, to help ensure quality of service provided by the network node. The present invention may also be used to block, in whole or in part, network traffic, thereby protecting the network node in or near the path of such traffic from denial of service attacks.

A number of sensors are distributively deployed in the network. The sensors are either integrally disposed in a number of routing devices of the network or externally disposed and coupled to the routing devices. The sensors monitor and report on network traffic routed through the routing devices. A director is also provided to receive network traffic reports from the sensors for the routing devices, and to determine whether moderating actions are to be taken to moderate an amount of network traffic destined for at least one of a number of network nodes of the network, based at least in part on some of the network traffic reports received from the sensors. In one embodiment, upon determining moderating actions are to be taken, the director further determines the moderating actions to be taken, including where the moderating actions are to be taken. In one embodiment, the director further instructs appropriate ones of the sensors to cause the desired moderating actions to be applied on the network traffic going through some of the routing devices.

In one embodiment, the director, in cooperation with the sensors, also determines when and where moderating actions are to be relaxed, and causes such relaxation to be effectuated. In yet another embodiment, the director, in cooperation with the sensors, also determines when and where regulating actions filtering out certain types of network traffic destined for a network node are to be applied, and causes such filtering to be performed.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as requesting, reporting, determining, data, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. The terms "routing device", and "route" are used throughout this application, in the claims as well as in the specification. The terms as used herein are intended to have a broader meaning than its normal plain meaning as understood by those ordinarily skilled in the networking art. They are intended to be genus terms that include the conventional routers and conventional routing and forwarding, as well as all other variations of network trafficking, such as, switches or switching, gateways, hubs and the like. Thus, unless particularized, the terms are to be given this broader meaning. Further, the description repeatedly uses the phrase "in one embodiment", which ordinarily does not refer to the same embodiment, although it may.

Overview

Figure 1:
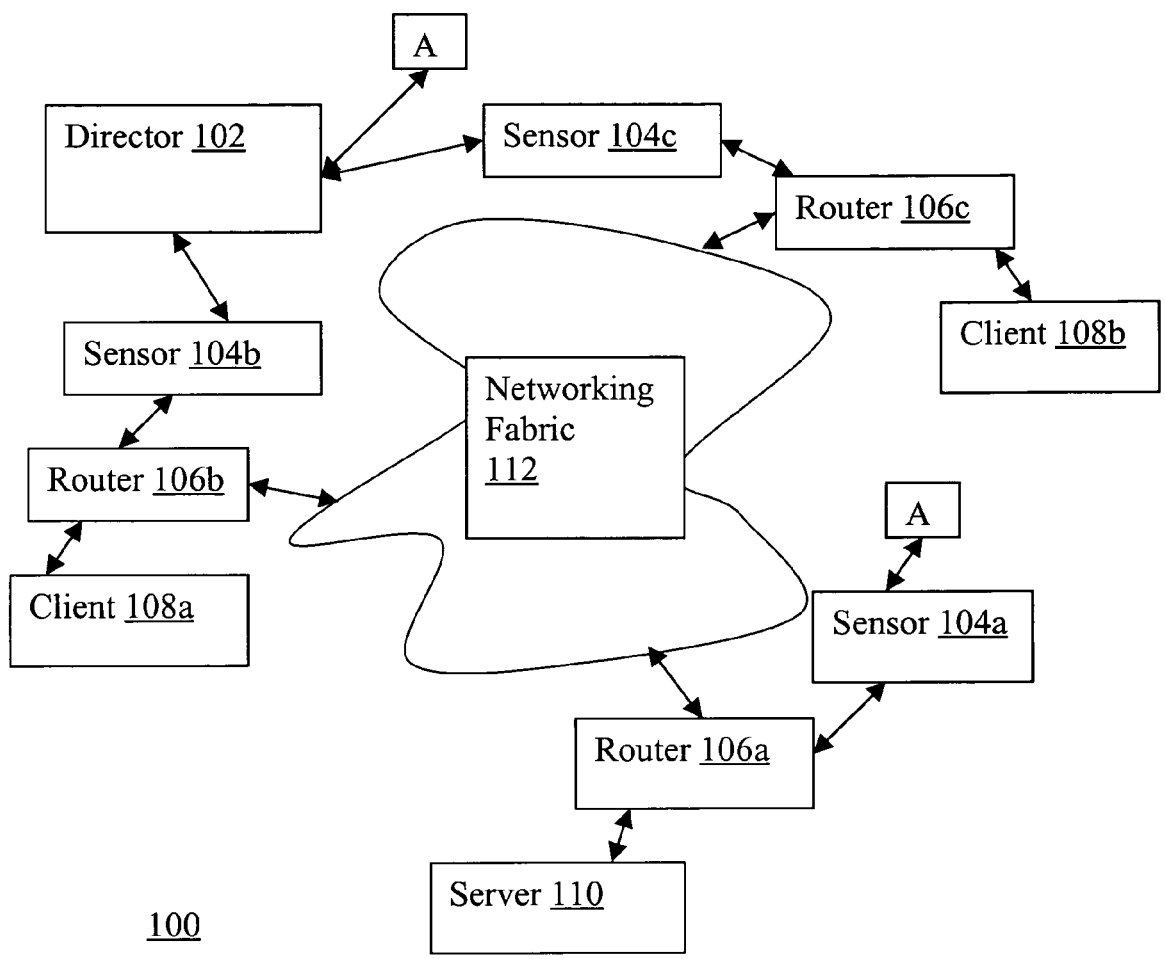
FIG. 1 illustrates a network view of the present invention, including a number of distributively deployed sensors and a director, in accordance with one embodiment.
Figure 2:
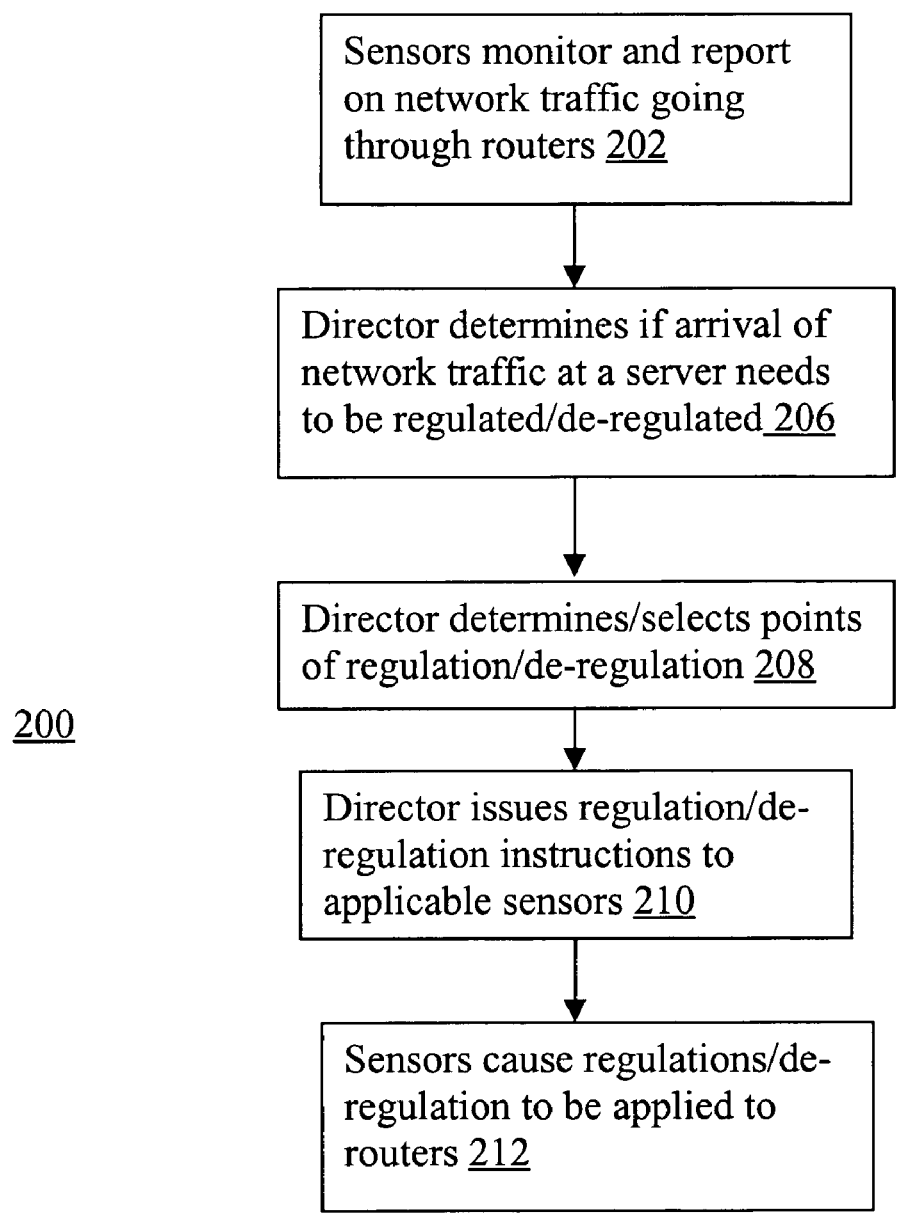
FIG. 2 illustrates a method view of the same invention, in accordance with one embodiment.

Referring now first to FIGS. 1–2, wherein two block diagrams illustrating a network view and a method view of the present invention, in accordance with one embodiment, are shown. As illustrated in FIG. 1, in accordance with the present invention, a number of distributively disposed sensors, such as sensors 104a–104c, are provided to monitor and report on network traffic routed through routing devices of network 100, such as routing devices 106a–106c, for various network nodes, such as clients 108a–108b and server 110. Further, director 102 is provided to determine whether regulatory actions are to be taken to regulate an amount of network traffic destined for a network node, such as server 110, to ensure quality of service provided by the network node. Director 102 advantageously makes the determination automatically, based at least in part on the network traffic data reported by the sensors.

Further, director 102 advantageously determines the nature of the regulatory action, including where the regulatory actions are to be taken. As will be explained in more detail below, in a preferred embodiment, the regulatory actions are advantageously administered at locations away from the network node itself. Director 102 also determines at a subsequent point in time whether to relax the regulatory actions. In like manner, director 102 also determines the amount of relaxation and which regulated locations are to be partially or completely de-=regulated.

Network 100 is intended to represent a broad range of private as well as public networks or interconnected networks, such as the network of an Internet Service Provider (ISP), the enterprise network of a multi-national corporation, or the Internet.

Networking nodes, such as clients 108a–108b and server 110 are coupled to each other through routing devices 106a–106c and networking fabric 112. As disclosed earlier, routing devices 106a–106c are intended to represent a broad range of network trafficking equipment, including but not limited to conventional routers, switches, gateways, hubs and the like. Networking fabric 112 is intended to represent a broad range of interconnected local as well as wide area networks, formed with the aforementioned and other networking equipment known in the art.

For the illustrated embodiment, sensors 104a–104c are externally disposed and correspondingly coupled to routing devices 106a–106c. In a preferred embodiment, sensors 104a–104c are proximately disposed to routing devices 106a–106c situated at the boundary entry points of different domains of the network. For example, in the case of the Internet, sensors 104a–104c are advantageously disposed "adjacent" to routing devices located at the "points of presence" of the Internet, including those "points of presence" where networks peer (exchange traffic) with one another, and where networks connect to their customers.

In alternate embodiments, each sensor 104a, 104b or 104c may monitor and report on the network traffic routed through more than one router, as opposed to the corresponding configuration illustrated for ease of understanding. In yet other embodiments, some or all of sensors 104a–104c may be integrally disposed within routing devices 106a–106c instead. Sensors 104a–104c, whether externally disposed or integrally disposed, are additionally coupled to director 102. The coupling may be made using any one of a number of communication links known in the art, such as modem links over conventional phone lines, serial communication lines, parallel communication lines, Digital Subscriber Lines (DSL), Integrated Service Digital Network (ISDN) connections, Asynchronous Transfer Mode (ASM) links, Frame Relay connections, Ethernet, IP networks, packet-switched wireless networks, and the like.

While for ease of understanding, only one director 102, and a handful each of network nodes, clients 108a–108b and server 110, routing devices 106a–106c and sensors 104a–104c are included in the illustration, from the description to follow, those skilled in the art will appreciate that the present invention may be practiced with more than one director (or director device) 102 as well as more or less network nodes, routing devices 106a–106c and sensors 104a–104c. If more than one director/director device 102 is employed, each director/director device 102 may be assigned responsibility for a subset of sensors 104a–104c, and the directors may relate to each other in a master/slave relationship, with one of the directors serving as the "master" (and the others as "slave"), or as peers to one another or organized into an hierarchy.

As illustrated in more details in FIG. 2, in accordance with the present invention, distributively disposed sensors 104a–104c monitor and report on network traffic routed through routing devices 106a–106c, block 202. The reporting may be self-initiated or provided in response to a request. In one embodiment, the reported data include various statistics describing the network traffic that is forwarded. In one embodiment, the reported data may include destination information, allowing the amount of network traffic destined for various network nodes of interest be discernable; volume of data with specific destinations passing through a routing device; volume of data from specific source addresses passing through a routing device; volume of data with specific source and destination address combinations, the types of traffic passing through a routing device; and characteristics of packets of data. Examples of "traffic type" include Web, DNS, Real Networks, Secure Web, Other TCP, Other UDP, ICMP, TCP packets with ACK set, TCP packets without SYN set, and so forth. Examples of "characteristics" include distribution of lengths of packet, distribution of Time To Live values, and so forth.

At block 206, in response to the receipt of the reported data, director 102 automatically determines whether arrival of network traffic at a network node of interest needs to be regulated or de-regulated. The network nodes of interest may be provided to director 102 statically or dynamically (including additions as well as subtractions) in any one of a number of techniques known in the art.

In its simplest form, regulation may mean moderating the arrival rate of network traffic destined for a network node of interest. However, regulation may also mean moderating the arrival of particular types and/or characteristics of network traffic. At its extreme, regulation could include completely blocking off network traffic destined for the network node of interest. Similarly, de-regulation means relaxing the amount of moderation being applied to the network traffic destined for the network node of interest, in terms of volume, type, characteristics and so forth. In its most fundamental form, de-regulation could simply involve removal of existing regulations in effect for network traffic destined for the network node of interest.

At block 208, director 102 determines and/or selects the locations to administer the regulation/de-regulation. In one embodiment, boundary entry locations with the largest volume of network traffic destined for the network node are selected for regulation, and boundary entry locations with the most stringent regulations are selected for de-regulation. At 210, director 102 also determines the regulation/de-regulation actions. Examples of moderating actions include but are not limited to limiting the bandwidth available for, lowering the priority, or altering the route of network traffic destined for the network node of interest (including perhaps changing their destinations). Accordingly, examples of moderation relaxation actions include but are not limited to their "inverses", i.e. expanding the bandwidth available for, increasing the priority, reconfiguring to potentially shorter routes of network traffic destined for the network node of interest. Similarly, examples of blocking actions include but are not limited to filtering out network traffic destined for the network node of interest, and examples of unblocking actions include but are not limited to cessation of filtering of the network traffic destined for the network node of interest.

Those skilled in the art will appreciate that the present invention is a superior approach to the prior art approach of regulating network traffic at the network node of interest, using e.g. a firewall. By regulating/de-regulating at remote locations, the present invention advantageously allows the regulation/de-regulation to be administered in a substantially source oriented manner, that is at locations close to the sources of the network traffic (even though the sources often time can not be precisely determined). Further, the remote regulation/regulation lightens the workload at the network node of interest, and allows the bandwidth and resources of the network node be fully available and dedicated to servicing the arrived network traffic.

At block 210, director 102 issues the regulation/de-regulation instructions to the responsible ones of sensors 104a–104c, for the locations to be regulated/de-regulated, with respect to network traffics destined for the network nodes of interests. At block 212, instructed ones of sensors 104a–104c cause the desired regulation/de-regulation actions to be applied to their corresponding routing devices 106a–106c to effectuate the desired regulation/de-regulation of the network traffic for the particular nodes of interest. Sensors may also report on traffics impacted by the imposed regulations.

Sensors

Figure 3:
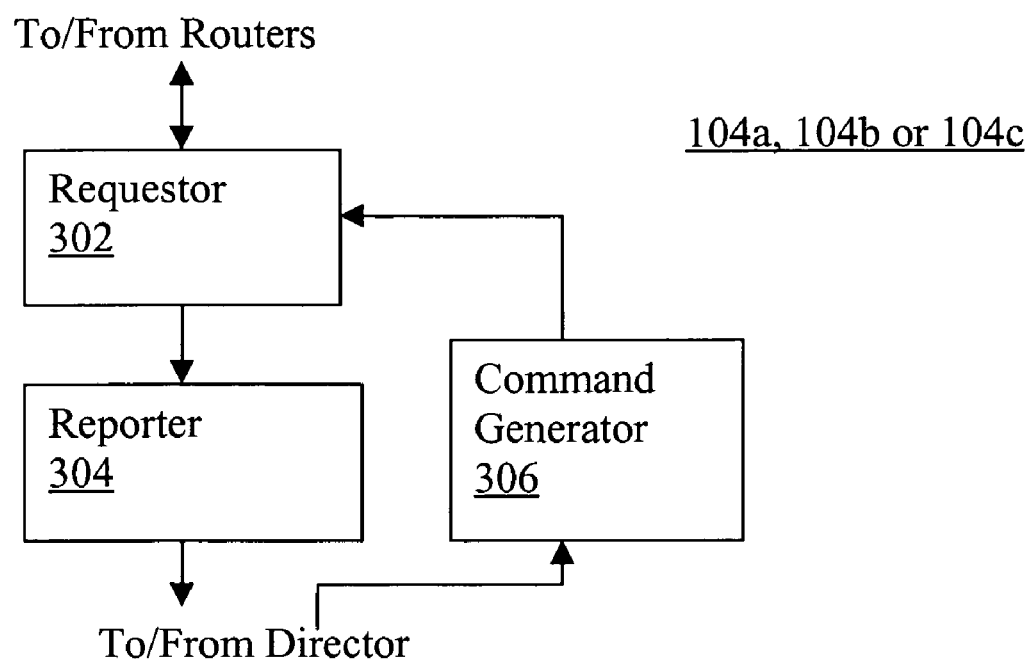
FIG. 3 illustrates a functional view of a sensor, in accordance with one embodiment.

FIG. 3 illustrates a functional view of a sensor, in accordance with one embodiment. The embodiment assumes the sensor is externally disposed, outside of its responsible router or routing devices. As illustrated, sensor 104a, 104b or 104c includes requestor function 302, reporter function 304 and command generation function 306 operatively coupled to each other as shown. Requestor function 302 is used to request a router or routing devices for data depicting network traffic routed through the routing device(s). The request/requests may be made periodically, on demand or in response to some event. The request/requests may be made using any one of a number of communication protocols known in the art. As alluded to, examples of such data are network traffic statistical data, and preferentially, the data include destination information of the network traffic routed. Requestor 302 is also used to request a routing device(s) to alter its/their routing operations to effectuate a desired regulation/de-regulation on the routing device(s), with respect to network traffic going through the routing device(s). The routing operation altering request commands are typically made as a result of regulation/de-regulation instructions provided by director 102. Similarly, the commands may be provided to the routing device(s) via any one of a number of communication protocols known in the art.

Reporter function 304 is used to report the gathered network traffic data. More specifically, reporter function 304 reports the gathered network traffic data to director 102. The report may be made periodically, on demand, or in response to some event, such as the occurrence of some pre-specified traffic condition. The report may be made in any one of a number of formats, via any one of a number of communication protocols known in the art.

Command generation function 306 generates the specific commands for the routing device(s) that is responsive to the regulation/de-regulation instructions received from director 102.

Figure 4:
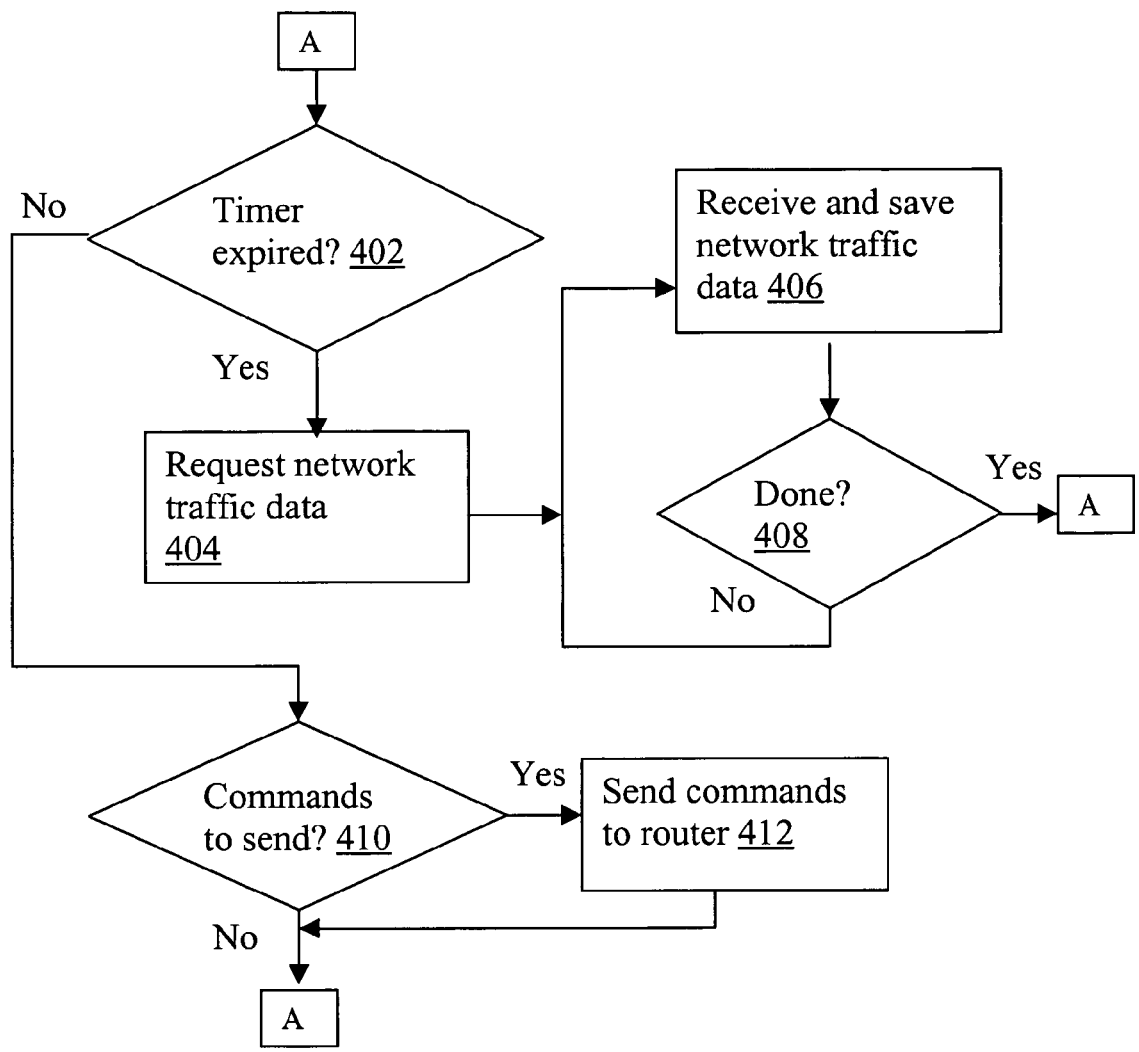
FIGS. 4–6 illustrate the operational flow of the relevant aspects of the requestor, reporter and command generation functions of FIG. 3, in accordance with one embodiment each.
Figure 5:
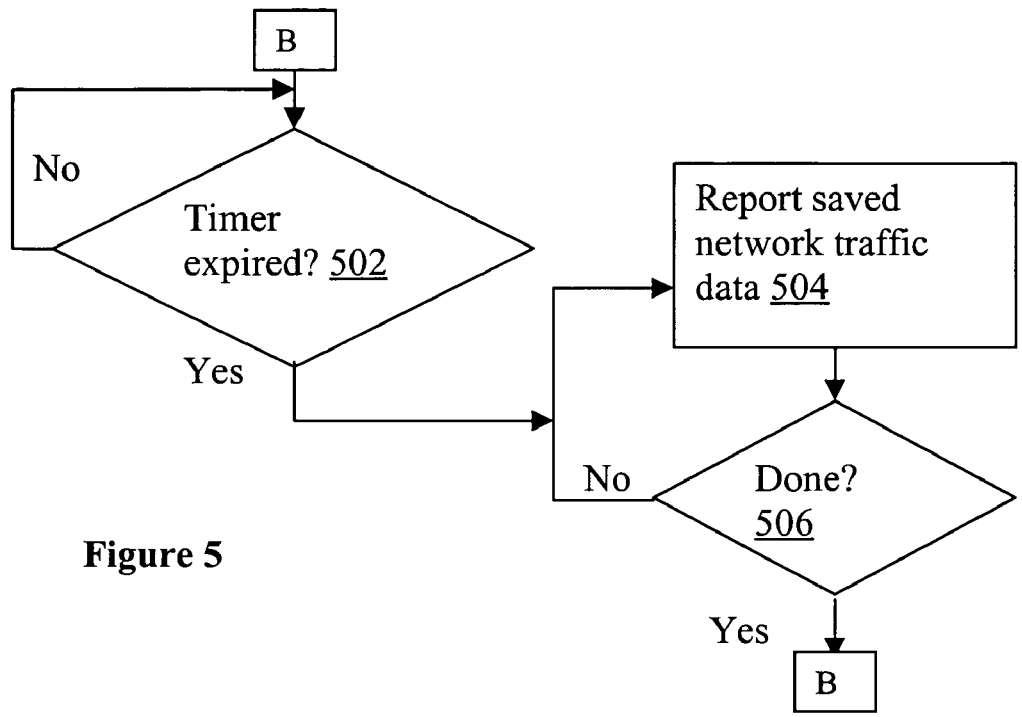
Figure 6:
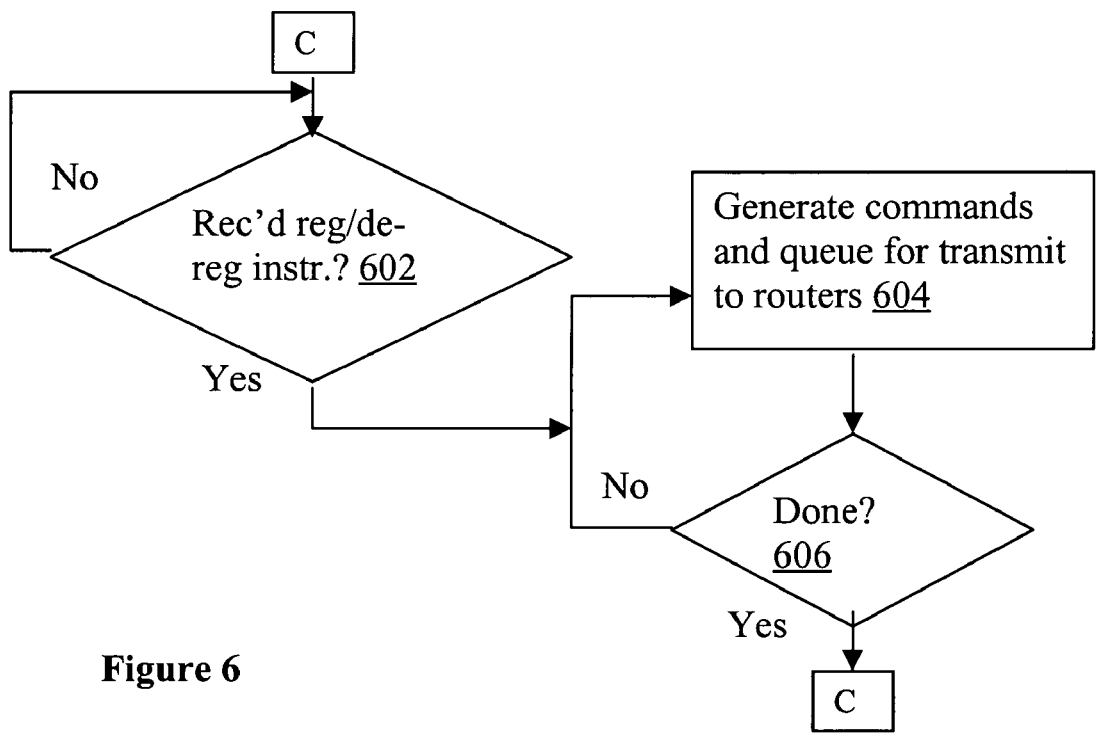

FIGS. 4–6 illustrate the operation flow of the relevant aspects of request function 302, report function 304 and command generation function 306, in accordance with one embodiment each. For request function 302, as illustrated in FIG. 4, upon start up, it awaits expiration of a timer, block 402. The periodicity of expiration is application dependent. Upon expiration of the timer, at block 404, request function 302 requests its responsible routing device(s) for network traffic data. The request may be for all network nodes, for particular network nodes of interest or some other subset of network traffic. At blocks 406 and 408, request function 302 accumulates and saves the network traffic data provided. Upon completion of the data transfer, requestor function 302 returns to block 402. However, if timer has not expired, block 402, request function 302 determines if any regulation/de-regulation commands are to be sent to its responsible routing device(s), block 410. If there are commands queued awaiting transmission to the routing device(s), request function 302 dequeues and sends the commands to the routing device(s) accordingly, block 412. Upon sending the commands, request function 302 returns again to block 402.

For report function 304, as illustrated in FIG. 5, in like manner, upon start up, it awaits for the expiration of a timer, block 502. Likewise, the periodicity of expiration is application dependent. Upon expiration, i.e. time for reporting, report function 304, takes the most recently received and saved network traffic data, and sends them to director 102, as earlier described, blocks 504–506. Upon transmission, report function 304 returns to block 502.

For command generation function 306, as illustrated in FIG. 6, upon start up, it awaits for regulation/de-regulation instructions from director 102, block 602. Upon receipt of regulation/de-regulation instructions, command generation function 306 generates the appropriate commands for the particular routing device(s) the sensor is responsible, and queues the commands for transmission to the routing device(s), as alluded to earlier. Upon generating and queuing the appropriate commands, function 306 returns to block 602 to await additional regulation/de-regulation instructions from director 102.

Figure 7:
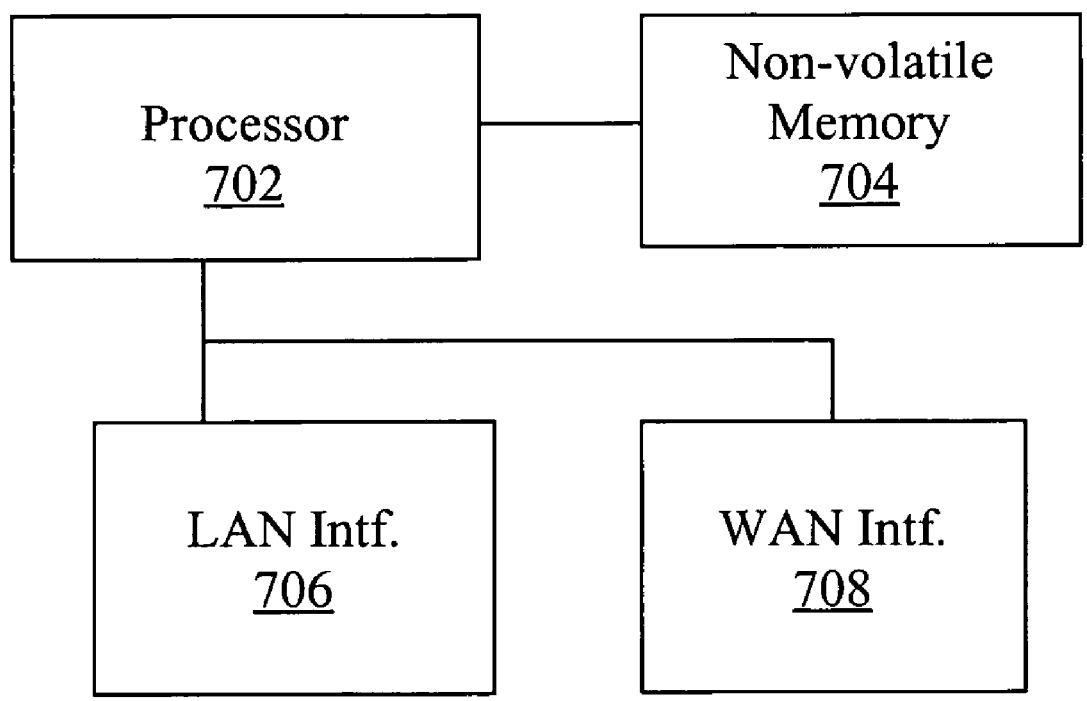
FIG. 7 illustrates an architectural view of a sensor, in accordance with one embodiment.

FIG. 7 illustrates an architectural view of a sensor, in accordance with a hardware/firmware implementation. As illustrated, sensor 700 includes processor 702, non-volatile memory 704, LAN and WAN interfaces 706 and 708. Processor 702 and non-volatile memory 704 are intended to represent a broad range of these elements known in the art. In the case of processor 702, it may be any 8-bit/16-bit micro-controllers, or 16-bit/32-bit digital signal processors, or even more powerful general purpose microprocessors known in the art. Non-volatile memory 704 may be EEPROM, Flash memory or other memory of the like. Non-volatile memory 704 is employed to store the firmware implementing the earlier described request, report and command generation functions of sensor 700, and for the embodiment, facilitates these functions execution in place. LAN interface 706 may be an Ethernet, Token Ring or other LAN interfaces of like kind, and WAN interface 708 may be a modem, or an ISDN adapter and the like.

In an alternate embodiment, request, report and command generation functions 302–306 of FIG. 3, may be implemented in software via high level languages such as C, and the software implementation may be hosted by a computing device near its responsible routing device(s), provided the hosting computing device is properly equipped with the appropriate communication interfaces to communicate with its responsible routing device(s), and director 102.

In yet other embodiments, as alluded to earlier, request, report and command generation functions 302–306 of FIG. 3, may be incorporated as an integral part of its responsible router. In these embodiments, instead of gathering the network traffic data via request/reply transaction conducted over a communication protocol, request function 302 may gather the network traffic data through bus transactions, such as direct memory access (DMA) operations accessing the appropriate internal storage units of the router for the collected data. Similarly, in lieu of generating commands designed for a command interface, command generation functions may directly invoke the applicable router routines to cause the routing operation alteration to be effectuated instead.

Director

Figure 8:
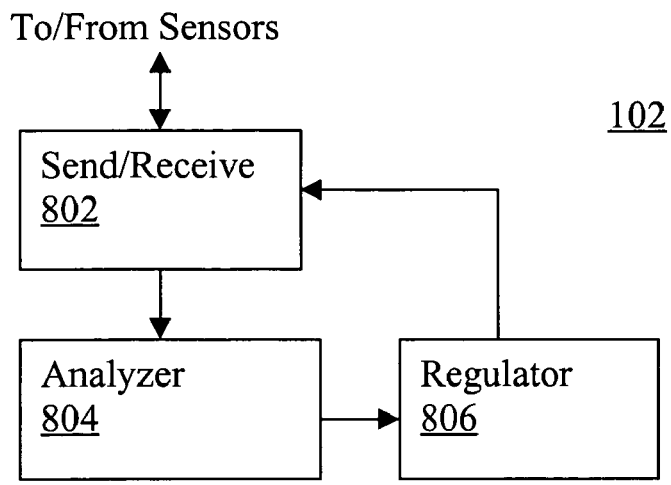
FIG. 8 illustrates a functional view of a director, in accordance with one embodiment.

Referring now to FIG. 8, wherein a functional view of the director, in accordance with one embodiment is shown. As illustrated, director 102 includes send/receive function 802, analyzer 804, and regulator 806, operatively coupled to each other as shown. Send/receive function 802 is employed to receive network traffic data reported by the distributively disposed sensors, and to send regulation/de-regulation instructions to the distributively disposed sensors. Analyzer 804 analyzes the network traffic data to determine if regulation/de-regulation actions need to be taken, and alerts regulator 806 accordingly. In one embodiment, analyzer 804 determines if regulation/de-regulation actions need to be taken based on whether the volume of traffic has reached a moderating/filtering threshold (in the case of regulation), or fell below a relaxation threshold (in the case of de-regulation). Regulator 806 is used to determine the location or locations of regulation/de-regulation, and what the regulation/de-regulation actions should be. In one embodiment, boundary entry points with the largest amount of network traffic destined for a network node of interest are selected for regulation, whereas the most regulated boundary entry points are selected for de-regulation. In another embodiment, boundary entry points with above threshold level of certain "undesirable" network traffic destined for a network node of interest are selected for regulation, whereas regulated boundary entry points with below threshold level of the "undesirable" network traffic are selected for de-regulation. Threshold level may simply be the presence of any of such traffic. As described earlier, "undesirable" may be any volume, type and/or characteristic of network traffic.

Figure 9:
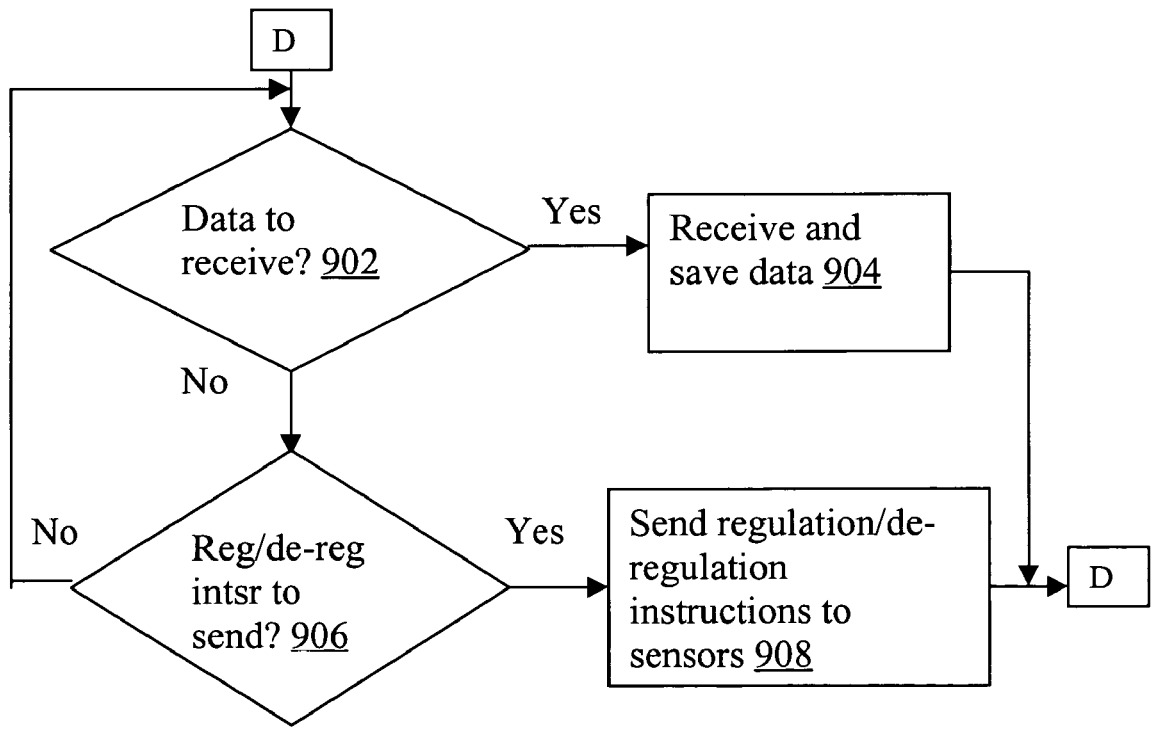
FIGS. 9–11 illustrate the operational flow of the relevant aspects of the send/receive, analyzer and regulator functions of FIG. 8, in accordance with one embodiment each.
Figure 10:
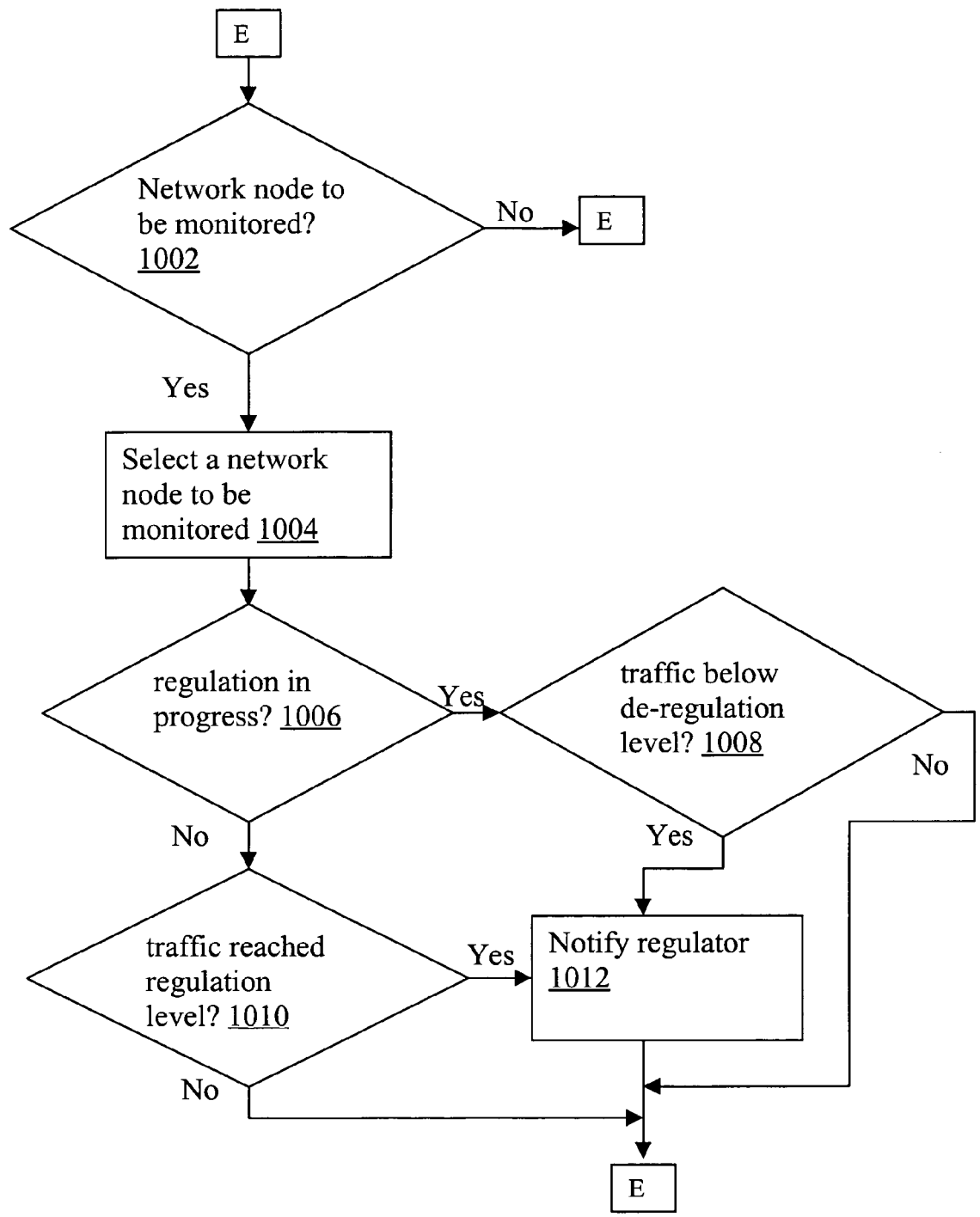

FIGS. 9–10 illustrate the operational flow of the relevant aspects of the send/receive, analyzer and regulation functions 802–806, in accordance with one embodiment each. As illustrated in FIG. 9, for the send/receive function, upon start up, it determines if there are network traffic data to be received from the sensors, block 902. If there are, send/receive function 802 receives the network traffic data being reported accordingly. If there are not, send/receive function 802 determines if there are regulation/de-regulation instructions to be sent to the sensors. If there are, send/receive function 802 sends the regulation/regulation instructions accordingly. If there are not, send/receive function 802 returns to block 902 to determine if there are data to be received again.

As illustrated in FIG. 10, upon start up, analyzer 804 determines if there are network nodes to be analyzed, block 1002 or some other instruction requiring analysis of network traffic. If there are not, it awaits for the "enrollment" of a network node of interest or some other pre-defined event or state. If there are, analyzer 804 selects a network node to be monitored, block 1004. Analyzer 804 further determines if regulations are being administered on behalf of the network node, block 1006. If network traffic is being regulated, analyzer 804 further determines if the network traffic has fallen below the de-regulation threshold or thresholds, 1008. If the network traffic has not fallen below the de-regulation threshold/thresholds, no actions are taken. If the network traffic has fallen below the de-regulation threshold/thresholds, analyzer 804 notifies/alerts regulator 806 accordingly, block 1012. Back at block 1006, if regulation is not in progress, analyzer 1010 determines if the network traffic has reached a regulation threshold or thresholds, 1008. If the network traffic has not reached or surpassed the regulation threshold/thresholds, no actions are taken. If the network traffic has reached or surpassed the regulation threshold/thresholds, analyzer 804 notifies/alerts regulator 806 accordingly, block 1012.

Figure 11:
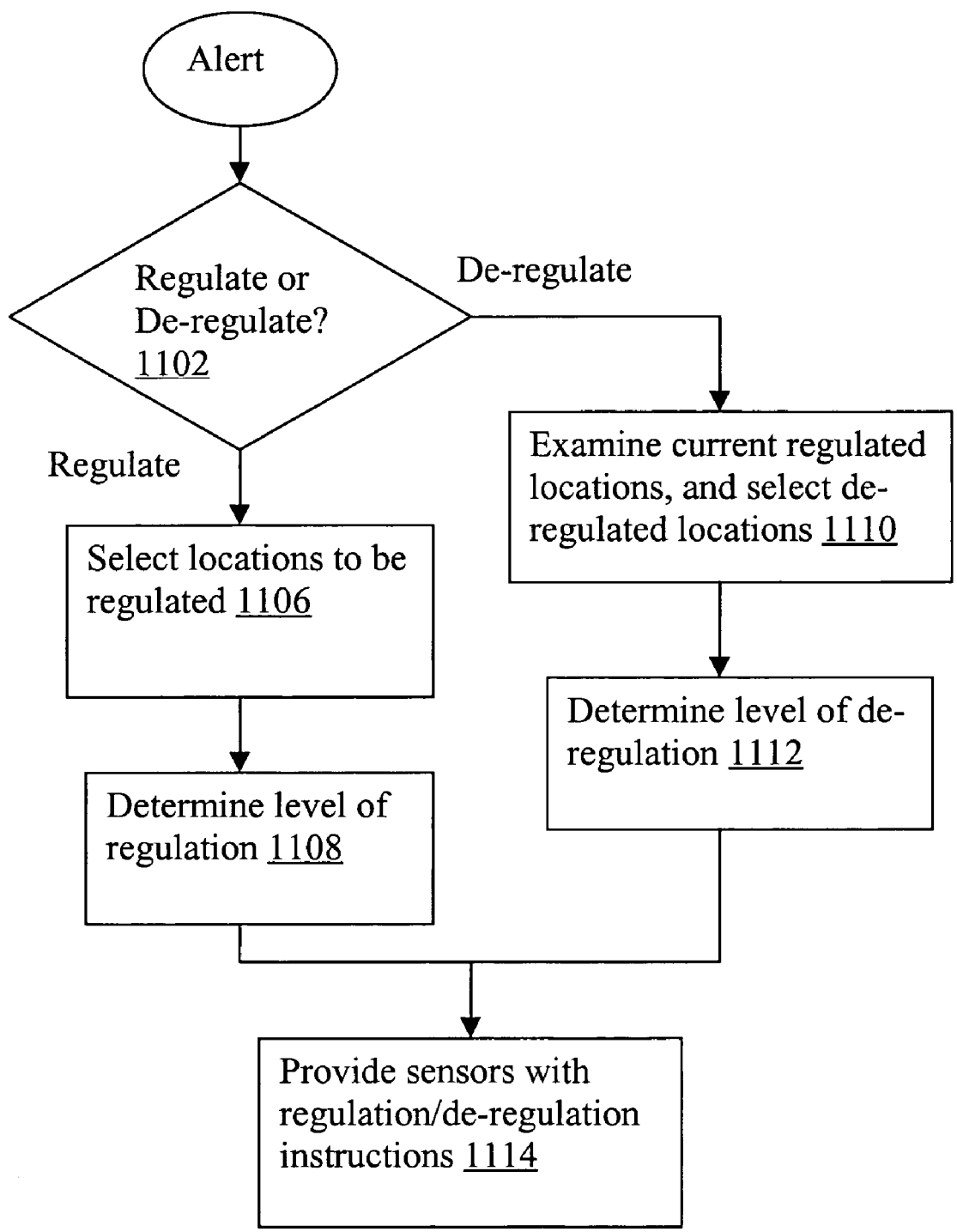

As illustrated in FIG. 11, upon receipt of an alert, regulator 806 determines if the alert is for regulation or de-regulation, block 1102. If the alert is for regulation, regulator 806 selects the boundary entry points for regulation, 1106. Further, regulator 806 also determines the level of regulation, e.g. how much bandwidth to reduce, or how many priority levels to drop, block 1108. Upon making these determinations, regulator 806 provides the appropriate sensors with the regulation/de-regulation instructions accordingly, block 1114. On the other hand, if the alert is for de-regulation, regulator 806 selects the most regulated boundary entry points for de-regulation, 1110. Further, regulator 806 determines the level of de-regulation, e.g. how much bandwidth to increase, or how many priority levels to bump up, block 1112. Upon making these determinations, regulator 806 provides the appropriate sensors with the regulation/de-regulation instructions accordingly, block 1114.

Example Host Computer System

Figure 12:
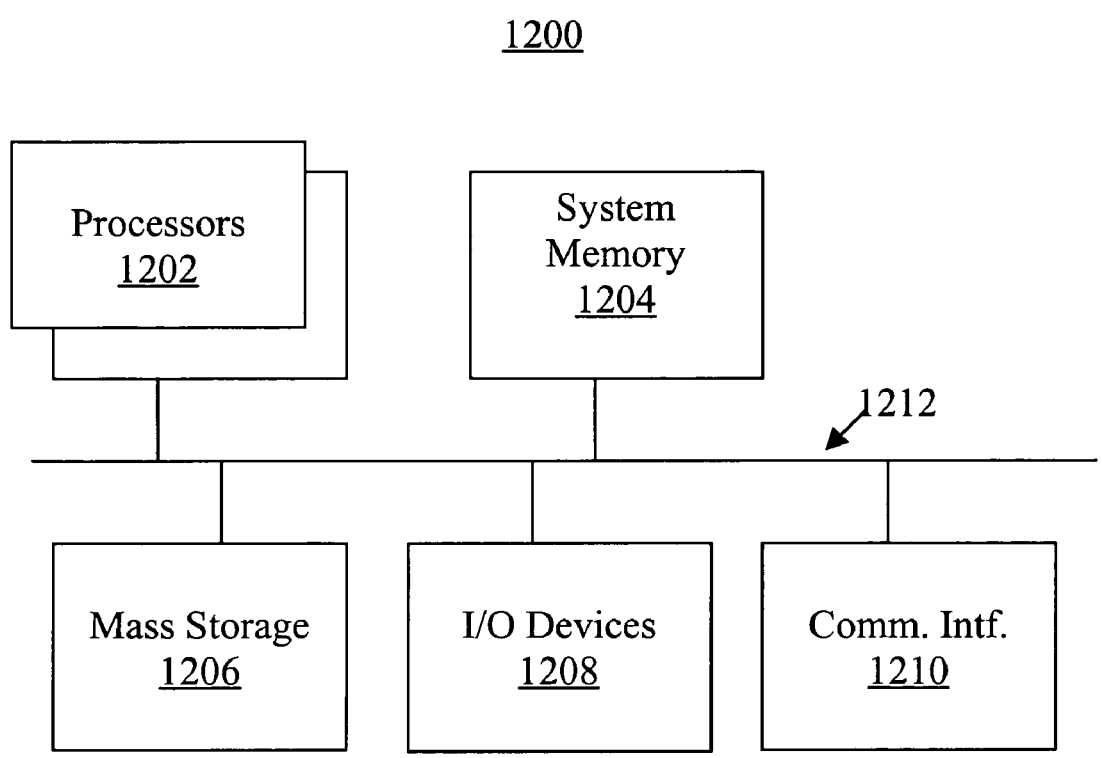
FIG. 12 illustrates an example computer system suitable for use to host a software implementation of a sensor or the director, in accordance with one embodiment.

FIG. 12 illustrates an example computer system suitable for use as either a host to a software implementation of a sensor, or the director in accordance with one embodiment. As shown, computer system 1200 includes one or more processors 1202 (typically depending on whether it is used as host to sensor or the director), and system memory 1204. Additionally, computer system 1200 includes mass storage devices 1206 (such as diskette, hard drive, CDROM and so forth), input/output devices 1208 (such as keyboard, cursor control and so forth) and communication interfaces 1210 (such as network interface cards, modems and so forth). The elements are coupled to each other via system bus 1212, which represents one or more buses. In the case of multiple buses, they are bridged by one or more bus bridges (not shown). Each of these elements perform its conventional functions known in the art. In particular, system memory 1204 and mass storage 1206 are employed to store a working copy and a permanent copy of the programming instructions implementing the teachings of the present invention. The permanent copy of the programming instructions may be loaded into mass storage 1206 in the factory, or in the field, as described earlier, through a distribution medium (not shown) or through communication interface 1210 (from a distribution server (not shown). The constitution of these elements 1202–1212 are known, and accordingly will not be further described.

CONCLUSION AND EPILOGUE

Thus, it can be seen from the above descriptions, a novel method and apparatus for regulating network traffic using a distributed approach has been described. The novel scheme enables the quality of service provided by a network node to be ensured, including nullification of denial of service attacks.

While the present invention has been described in terms of the above illustrated embodiments, those skilled in the art will recognize that the invention is not limited to the embodiments described. The present invention can be practiced with modification and alteration within the spirit and scope of the appended claims. For examples, as alluded to earlier, the present invention may be practiced with more or less sensors, more directors, and so forth. Thus, the description is thus to be regarded as illustrative instead of restrictive on the present invention.

What is claimed is:

1. A network comprising:
   a plurality of network nodes;
   a plurality of routing devices to route network traffics between selected ones of said network nodes;
   a plurality of sensors, either integrally disposed in a subset of said routing devices or externally disposed and coupled to the subset of routing devices, to monitor and report on network traffic routed through the subset of routing devices in different network domains; and
   one or more director devices corresponding to the network domains to facilitate receipt of information on network traffic from the sensors for said subset of routing devices, and to determine in response whether moderating actions, to respond to a denial of service attack on the network, are to be taken to moderate an amount of network traffic destined for at least one of said network nodes, to nullify the denial of service attack based at least in part on some of said network traffic information received from said sensors.

2. The network of claim 1, wherein the sensors are equipped to periodically gather data denoting at least amount of network traffic routed through said subset of routing devices, said data including destinations of said network traffic.

3. The network of claim 1, wherein the sensors are equipped to periodically report to said director devices data denoting at least amount of network traffic routed through said subset of routing devices, said data including destinations of said network traffic.

4. The network of claim 1, wherein the sensors are equipped to facilitate application of desired moderation on network traffic through selected ones of said subset of routing devices.

5. The network of claim 1, wherein the director devices are further employed to determine in response moderating actions to be taken, including where the moderating actions are to be taken, if the director devices determine that moderating actions are to be taken to moderate the amount of network traffic.

6. The network of claim 1, wherein the director devices are further employed to determine in response whether moderating actions are to be relaxed for the at least one of the network nodes, based at least in part on some of said network traffic reports received from said sensors.

7. The network of claim 6, wherein the director devices are further employed to determine in response moderation relaxation actions to be taken, including where the moderation relaxation actions are to be taken, if the director devices determine that moderation relaxation actions are to be taken to relax moderation on the amount of network traffic.

8. The network of claim 1, wherein the director devices are further employed to determine in response whether filtering actions are to be taken for the at least one of the network nodes, based at least in part on some of said network traffic reports received from said sensors.

9. The network of claim 8, wherein the director devices are further employed to determine in response where the filtering actions are to be taken, if the director devices determine that filtering actions are to be taken to filter out network traffic.

10. The network of claim 8, wherein the sensors are equipped to facilitate application of desired filtering on network traffic through selected ones of said subset of routing devices.

11. A method comprising:
    routing network traffic to and from a plurality of network nodes of a network;
    monitoring and reporting on a portion of said network traffic routed through a plurality of routing devices distributively disposed in the network using one or more director devices corresponding to different network domains to facilitate receipt of information on network traffic from sensors; and
    determining whether moderating actions are to be taken to moderate an amount of network traffic destined for at least one of said network nodes to nullify a denial of service attack, based at least in part on some of said network traffic reports received for said routing devices from said sensors indicating undesirable network traffic from the denial of service attack.

12. The method of claim 11, wherein said monitoring comprises periodically gathering data denoting network traffic routed through said routing devices, said data including destinations of said portion of network traffic.

13. The method of claim 11, wherein said reporting comprises periodically reporting on data denoting said portion of network traffic routed through said routing devices, said data including destinations of said portion of network traffic.

14. The method of claim 11, wherein said method further comprises facilitating application of desired moderation on network traffic passing through selecting ones of said routing devices.

15. The method of claim 11, wherein said method further comprises determining moderating actions to be taken, including where the moderating actions are to be taken, if it is determined that moderating actions are to be taken to moderate the amount of network traffic destined for a network node.

16. The method of claim 11, wherein the method further comprises determining in response whether moderating actions are to be relaxed for the at least one of the network nodes, based at least in part on some of said network traffic reports received from said sensors in the different network domains.

17. The method of claim 16, wherein the method further comprises determining in response moderation relaxation actions to be taken, including where the moderation relaxation actions are to be taken, if it is determined that moderation relaxation actions are to be taken to relax moderation on the amount of network traffic destined for a network node.

18. The method of claim 11, wherein the method further comprises determining in response whether filtering actions are to be taken for the at least one of the network nodes, based at least in part on some of said network traffic reports received from said sensors.

19. The method of claim 18, wherein the method further comprises determining in response where the filtering actions are to be taken, if it is determined that filtering actions are to be taken to filter out network traffic destined for a network node.

20. The method of claim 18, wherein the method further comprises facilitating application of desired filtering on network traffic through selected ones of said subset of routing devices.

21. The method of claim 11, wherein said sensing is performed using a collection of hierarchically organized devices.

22. The method of claim 11, wherein said determining is performed using the director devices, which are hierarchically organized devices.

23. An apparatus comprising:
(a) a storage medium having stored therein a plurality of programming instructions designed to implement (a.1) a requestor to request a routing device of a network for data denoting network traffic routed through said routing device, and to request alteration of routing operations of said routing device to moderate an amount of network traffic going through said routing device to respond to a denial of service attack on the network, (a.2) a reporter to report said data denoting network traffic routed through said routing device, and (a.3) a regulator to control submission of said network traffic moderation routing operation alteration requests to said routing device, responsive to moderation instructions provided to nullify the denial of service attack; and
(b) a processor coupled the storage medium to execute the programming instructions; and
a communication interface for coupling to at least one of a plurality of hierarchically organized director devices that are coupled to each other to facilitate data collection, analysis and traffic regulation.

24. The apparatus of claim 23, wherein the communication interface couples the apparatus to said routing device to facilitate submission of said network traffic moderation routing operation alteration requests to said routing device.

25. The apparatus of claim 23, wherein the director devices determine whether moderation actions are to be taken to moderate an amount of network traffic, based on said data reported, to facilitate reporting of said data to said director devices.

26. The apparatus of claim 23, wherein the requestor is further used to request alteration of routing operations of said routing device to moderate an amount of network traffic going through said routing device.

27. The apparatus of claim 23, wherein the requester is further used to request filtering operations of said routing device to filter out network traffic going through said routing device.

28. A networking apparatus comprising:
a first functional unit to route network traffic;
a second functional unit coupled to the first functional unit to gather data denoting network traffic routed through a routing device indicating undesirable network traffic from a denial of service attack, and to apply moderating actions to said first functional unit to moderate network traffic going through said networking apparatus;
a third functional unit coupled to the second functional unit to report said data;
a fourth functional unit coupled to the second functional unit to control application of said moderating actions to said first functional unit to effectuate a desired moderation of network traffic going through said networking apparatus, responsive to moderation instructions provided to nullify the denial of service attack; and
a plurality of hierarchically organized director devices that are coupled to each other to facilitate data collection, analysis and traffic regulation, and issue the moderation instructions, being coupled to the third functional unit and the fourth function unit.

29. The networking apparatus of claim 28, wherein the networking apparatus further comprises a communication interface coupled to the fourth functional unit, to couple said networking apparatus to said director devices that determine whether moderate actions are to be taken to moderate an amount of network traffic, based on said data reported, to facilitate reporting of said gathered data to said director.

30. The networking apparatus of claim 28, wherein the second functional unit is further used to relax moderating actions applied to the first functional unit to relax moderating an amount of network traffic going through said routing device.

31. The networking apparatus of claim 28, wherein the second functional unit is further used to cause the first functional unit to filter out network traffic going through said networking apparatus.

32. An apparatus comprising:
(a) a storage medium having stored therein a plurality of programming instructions designed to implement director devices in different network domains to receive reporting of data denoting network traffic routed through a plurality of routing devices of a network indicating undesirable network traffic from denial of service attack, and to determine in response whether moderating actions are to be taken to moderate an amount of network traffic destined for at least one of a plurality of network nodes of said network, based at least in part on some of said reported data to nullify the denial of service attack; and (b) a processor coupled the storage medium to execute the programming instructions.

33. The apparatus of claim 32, wherein said programming instructions are designed to determine whether a moderation threshold has been reached for a network node, based at least in part on some of said reported data.

34. The apparatus of claim 33, wherein said programming instructions are further designed to determine moderating actions to be taken, including where the moderating actions are to be taken, if it is determined that moderating actions are to be taken to moderate an amount of network traffic.

35. The apparatus of claim 32, wherein the apparatus further comprises a communication interface coupled to the processor, to couple the apparatus to a plurality of sensors to receive said data reporting.

36. The apparatus of claim 32, wherein the director further determines whether moderating actions being applied are to be relaxed, based at least in part on some of said reported data.

37. The apparatus of claim 32, wherein the director further determines whether filtering actions are to be taken to filter out network traffic, based at least in part on some of said reported data.

* * * * *